US006032127A

United States Patent [19]
Schkolnick et al.

[11] Patent Number: 6,032,127
[45] Date of Patent: *Feb. 29, 2000

[54] INTELLIGENT SHOPPING CART

[75] Inventors: Mario Schkolnick, San Jose, Calif.;
Robert Jacob von Gutfeld, New York, N.Y.

[73] Assignee: Intermec IP Corp., Woodland Hills, Calif.

[*] Notice: This patent is subject to a terminal disclaimer.

[21] Appl. No.: 08/955,467

[22] Filed: Oct. 21, 1997

Related U.S. Application Data

[63] Continuation of application No. 08/428,802, Apr. 24, 1995, Pat. No. 5,729,697.

[51] Int. Cl.⁷ ............................................. G06F 17/00
[52] U.S. Cl. ................................. 705/23; 705/22
[58] Field of Search ...................... 705/22, 23, 94

[56] References Cited

U.S. PATENT DOCUMENTS

| | | | |
|---|---|---|---|
| 4,075,632 | 2/1978 | Baldwin et al. | 343/6.8 |
| 4,656,463 | 4/1987 | Anders et al. | 340/572 |
| 4,929,819 | 5/1990 | Collins, Jr. | 235/383 |
| 5,005,125 | 4/1991 | Farrar et al. | 364/403 |
| 5,214,410 | 5/1993 | Verster | 340/572 |
| 5,250,789 | 10/1993 | Johnsen | 235/383 |
| 5,287,266 | 2/1994 | Malec et al. | 364/401 R |
| 5,295,064 | 3/1994 | Malec et al. | 364/401 R |
| 5,361,871 | 11/1994 | Gupta et al. | 186/61 |
| 5,418,354 | 5/1995 | Halling et al. | 235/383 |

FOREIGN PATENT DOCUMENTS

| | | |
|---|---|---|
| 0440370A1 | 8/1991 | European Pat. Off. . |
| 0494114A2 | 7/1992 | European Pat. Off. . |
| 0623904A1 | 11/1994 | European Pat. Off. . |
| 0170194A3 | 2/1986 | Germany ................. G06F 15/24 |

OTHER PUBLICATIONS

Burnell, John, "Supertag Gains International Distribution", ICL Retail Systems, 1994.
Gary Instant Checkout, Progressive Grocer, V73, n6, p10(1), Jun. 1994.

*Primary Examiner*—Emanuel Todd Voeltz
*Assistant Examiner*—Phillip Groutt
*Attorney, Agent, or Firm*—McGinn & Gibb, P.C.

[57] ABSTRACT

The present apparatus is a mobile shopping cart that can automatically keep track of objects selected and carried in the cart and provide a customer using the cart information like the total price of the items carried. The cart has a radio frequency cart base station with a cart antenna connected to a radio frequency cart transceiver. Various novel embodiments of the invention produce a radio frequency field within the shopping cart that is used to communicate with radio frequency tags on objects carried in the cart. The tags contain information about the respective carried object to which the tags are attached. A program function executed by the cart circuit and/or computer controls the cart transceiver to interrogate radio frequency tags within the radio frequency field, i.e. inside the cart to gain information about the carried objects. Tags on objects external to the cart are not interrogated.

33 Claims, 10 Drawing Sheets

FIG. 10

INTELLIGENT SHOPPING CART

This application is a continuation of application Ser. No. 08/428,802, filed on Apr. 24, 1995, now U.S. Pat. No. 5,729,697.

FIELD OF THE INVENTION

This invention relates to the field of radio frequency tagging. More specifically, the invention relates to using radio frequency tagging on a shopping cart to assist a shopper.

BACKGROUND OF THE INVENTION

The use of RF technology for recognizing items by means of RF tags has been well known for several decades. Examples of this technique include the tagging of animals for experimental purposes as well as tracking herds, pallets moving on the factory floor, the use of tags for inventory, automatically tendering highway tolls, tracking railway freight cars etc. The idea of using tags in place of bar codes at the checkout counter has also been proposal, most recently in public announcements by CSIR, in south Africa in conjunction with the British Technology Group (BTG). Here, it was shown that as many as 50 items in a shopping cart can be poled and registered in 1 second.

The concept of tagging items in supermarkets is described in U.S. Pat. No. 4,656,463 by Anders et al., European Patent Application 0 623,904 to Chenoweth et al., and European Patent Application 0 494,114 to Marsh et al. which are herein incorporated by reference in their entirety.

In Anders the tags have several applications; e.g., as a means for maintaining and tracking inventory on the shelves as items are removed by the customer. In addition, the market basket has an attached passive tag. Scanning is done by one or more antennas placed within the store at various positions. The antenna(s) send out interrogation signals over various time intervals. However, the main checkout is done at a counter through which the customer must pass prior to exiting the store. This method seems to require duplicate checking of objects in the store, i.e., a interrogation of the objects on the store shelf appears to be redundant with a final interrogation done at a check out counter. A necessary check out counter is also disclosed.

In Marsh, a shopping cart containing "transponders", presumably used to tag objects in the cart, is disclosed. An interrogator sends out an interrogation signal that causes the transponders to repeatedly transmit a response signal containing data identifying the transponder. Logic in each of the individual transponders is used to cease transmission of the individual transponder in response to interruptions in the interrogation signal that indicate the individual transponder has been identified. By doing this, it appears that the system can identify more than one transponder in a field of many transponders. However, the transponders are required to repeat transmission of their response signal to increase the probability of a successful reception (identification) by the interrogator. As the number of objects in the cart increases, it appears that the probability of a successful reception (identification) decreases. Furthermore, the interrogator is located at a "till" that the "trolley full of groceries" has to pass by in order to identify the transponders in the "trolley."

Chenoweth, a retail checkout system is disclosed that has a manual checkout device attached to a cart. However, each item selected has to be manually logged in by the shopper. This manual operation turns off an anti-theft tag on the selected object. Any object/item returned to the shelf must be manually logged out by the shopper. This process resets the anti-theft tag. Therefore, tracking and/or polling of the objects can only occur by manual customer action.

Other prior art describes carts that tender items as they are taken off the shelf and which subtract from the cart total if the item is put back on the shelf. However, there is no provision for constant periodic re-polling of the items. Thus, the customer must rely on the antenna at the shelf to subtract any items that are put back on the shelf. This is not as reliable or as assuring to the customer that the proper items are being polled in the final tally.

STATEMENT OF PROBLEMS WITH THE PRIOR ART

Buying in a store, such as a department store, convenience store, retail store, supermarket, or consumer warehouse, requires that the shopper perform two basic steps: 1. object/item selection and 2checkout. When selecting the objects, the shopper goes through the store selecting objects for purchase and moves them toward the store exit. Typically, the shopper is provided a cart or container, e.g. a basket, of some sort to carry the selected items. In the checkout step, a cashier totals the value of the selected objects, presents the shopper with a bill, and accepts payment from the shopper.

The prior art does not disclose or recognize any automatic way of indicating to the shopper how the total bill is affected as objects are added or removed from the cart. Some shopper might carry a calculator to determine this "running total". Alternatively, the shopper might perform the calculations mentally. Some prior art provides these mechanisms on the cart, however, this requires customer action which can be inaccurate and inconvenient.

The prior art does not disclose or recognize methods of providing a customer "store" information, like marketing information, while the customer is selecting objects. Other than store signs and circulars, there are limited convenient or effective ways of informing a shopper objects offered at a sale price. Further, there are limitations on instructing the shopper of the store layout and the specific locations of items in the store, including objects on sale.

The prior art has not disclosed or suggested a way to eliminate a checkout station, like a cashier or check out counter in the store. The checkout is executed before the customer leaves the store. It involves a number of steps such as getting in line for a checkout register, presenting the objects to the cashier, totaling the amount of the bill for all the objects, paying the bill, and taking the objects out of the store. The checkout procedure is time consuming because it usually requires a wait in line. Further, the objects often have to be rehandled by the shopper and/or the cashier and the bill total can be error prone. The store also has to provide a check out station which requires space for counters and registers that could be used for merchandise. In addition, there is the expense and management of cashiers.

OBJECTS OF THE INVENTION

An object of this invention is an improved system for shopper object selection and checkout in a store.

Another object of this invention is an improved system for shopper guidance and direction while shopping in a store.

Another object of this invention is an improved system for providing a running total of a bill during object selection in a store.

Another object of this invention is an improved system for eliminating checkout facilities and object handling in stores.

SUMMARY OF THE INVENTION

The present apparatus is a mobile shopping cart or container that can automatically keep track of objects selected and carried in the cart and provide a customer using the cart information like the total price of the items carried. The cart has a radio frequency cart base station with a cart antenna connected to a radio frequency cart transceiver. Various novel embodiments of the invention produce a radio frequency field within the shopping cart that is used to communicate with radio frequency tags on objects carried in the cart. The tags contain information (object descriptions) about the respective carried object to which the tags are attached.

The radio frequency tags inside the cart are interrogated to gain information (object descriptions) about the carried objects. Tags on objects external to the cart are not interrogated. This is possible because the radio frequency field used to interrogate the tags is not permitted to penetrate (or penetrate very little) beyond one or more sides of the cart. Alternative embodiments are disclosed that enable the customer to track a running total of the price of objects carried in the cart (or other information about the object) while accounting for objects that are added or removed from the cart.

The customer can pay for the objects carried on the cart in one embodiment with a payment apparatus on the cart. This allows for elimination of the check out stations in the store. A security station used to prevent theft of objects is also described. Communication links between a store computer and the cart can be used to communicate (object locations, store maps, objects on sale, etc.) with the customers while they are selecting objects and to facilitate store inventory.

BRIEF DESCRIPTION OF THE DRAWINGS

FIG. 3, comprising

FIG. 5, comprising

DETAILED DESCRIPTION OF THE INVENTION

Figure 1:
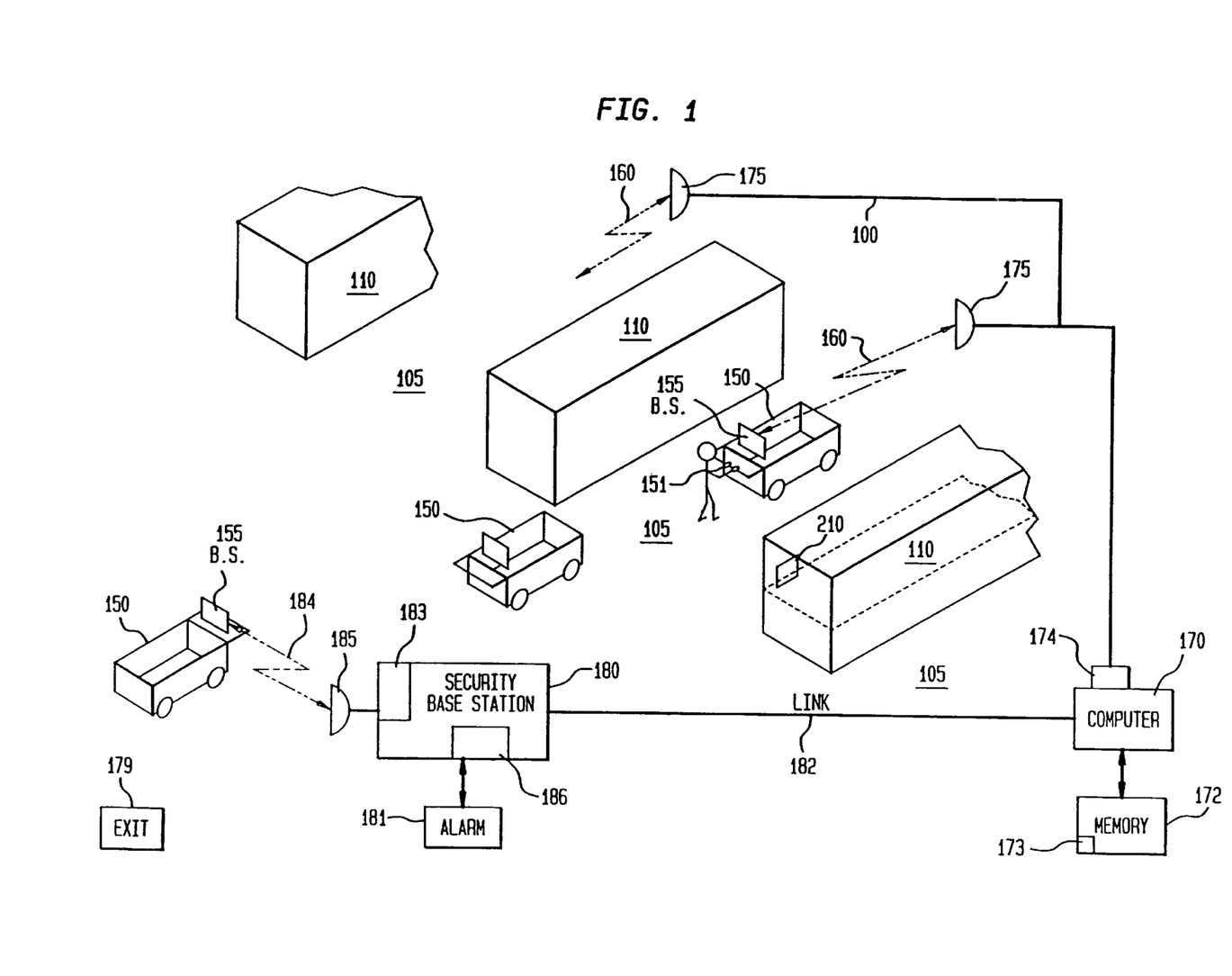
FIG. 1 is a block diagram showing the present invention in use in a store.

FIG. 1 is a block diagram showing the present invention and its novel use in a store. The system comprises a storage area or areas 110. These storage areas can be shelves or cabinets or any type of storage facility on which objects 210 are stored. Between the storage areas 110 are access areas or aisles 105. The aisles 105 permit people to access the objects 210 in the storage area 110. People/customers 151 moving novel carts 150 through the aisles 105 select objects 210 from the storage area 110. The customer 151 selects the objects 210 from the storage area 110 by placing the objects 210 in the cart 150. Stores like this are well known. For example, any retail or wholesale type of store will have objects 210 stored in storage areas with aisle access as shown in the figure. Objects 210 could include food, can goods, produce, package goods, hardware, lumber, housewares and any other item that is sold and can be carried in a cart or container 150. Objects can also come individually or in a package. For example, either one can of soda or a six pack of soda can be an object 210.

The store will also have a store computer 170. Store computer 170 will have a store memory 172 and store information 173 stored on the store memory 172. The store computer 170 will control a store transceiver 174. The store transceiver is a radio frequency transceiver that can send and receive radio frequency information through a store antenna 175. The radio frequency information sent and received are called store signals 160 and will be communicated to and from base stations 155 located on the one or more shopping carts that are travelling through the aisles 105 of the store.

The store antenna can be located in one location in the store and have a powered store signal 160 large enough to reach any shopping cart 150 located within the store. In an alternative embodiment the store antenna 175 may comprise more than one antenna 175, each located at various positions within the store so that a lower power signal 160 can be sent to communicate with the shopping carts 150 at locations within the store in proximity to each of the antennas 175.

In addition, the system 100 will have one or more security base stations 180, each typically located near one of the exits of the store. The security base station 180 might be connected to the store computer 170 by a link 182. Links 182 like this are well known in the art and could include a radio frequency link or a hard wired link like a computer local area network. The security base station 180 can comprise a security computer 186 and a security antenna 185 attached to a security transponder 183. The security antenna 185 is capable of communicating with a base station 155 on any shopping cart 150 within proximity to the security base station 180. The security base station 180 is also capable of communicating with the radio frequency tags 200 on objects 210 located within the shopping cart 150. This communication is done with a security signal 184.

The security base station 180 can also include an alarm 181. This alarm can be a message on a computer terminal screen of the store computer 170 or any indication 181 to store personnel that might be required to indicate that store personnel might be needed at the exit 179.

Figure 2:
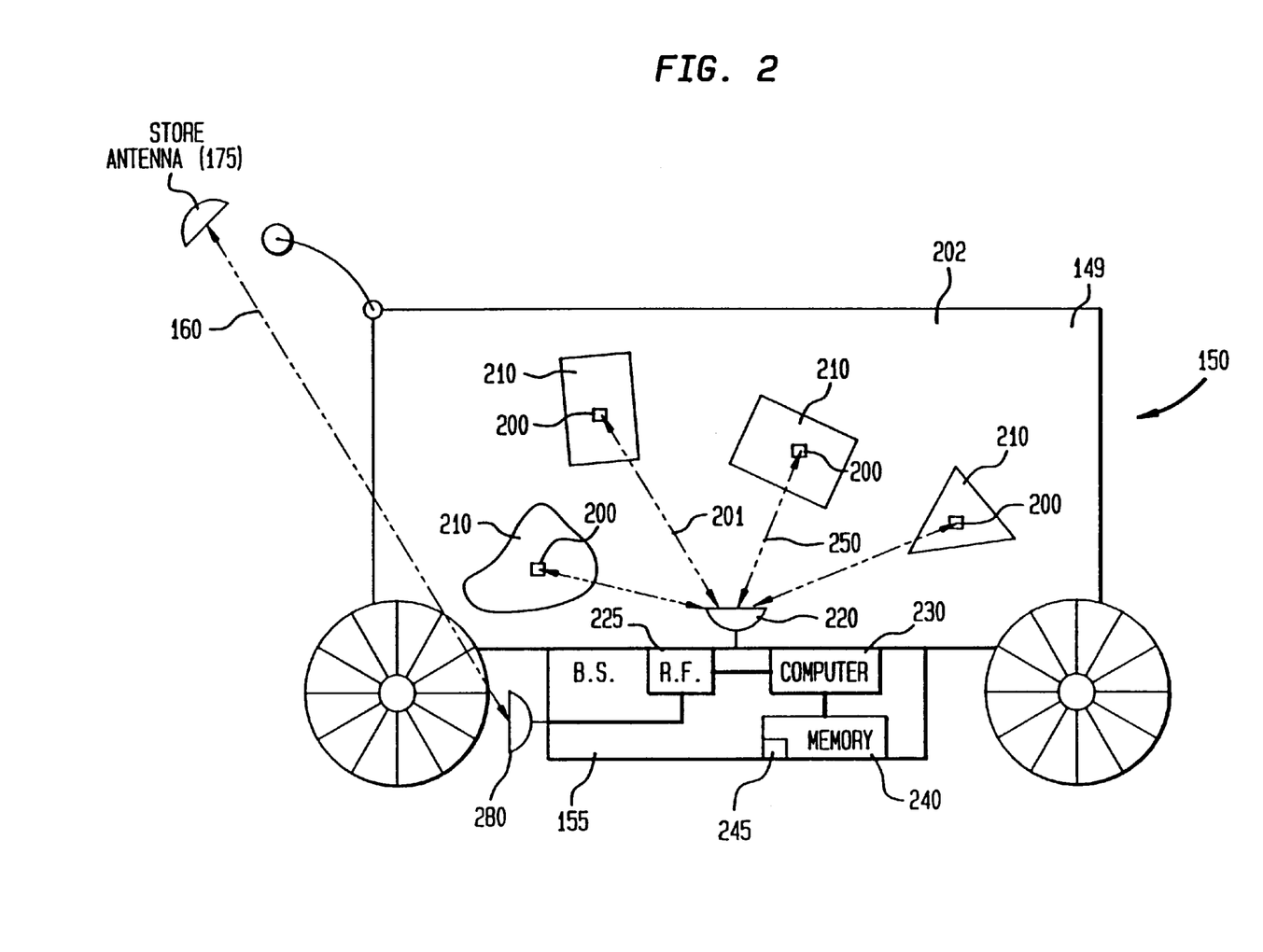
FIG. 2 is a block diagram of one embodiment of the present invention showing an intelligent shopping cart with a base station and objects in the shopping cart tagged with radio frequency tags.

FIG. 2 is a block diagram showing the present intelligent shopping cart 150. The shopping cart 150 comprises a cart holding section 149 for holding one or more objects 210 that are selected from the storage area 110 by the customer 151 and placed within the cart 150. Holding carts 149 capable of doing this are well known and include any type of supermarket shopping cart, hand-held basket, or any type of wagon or mobile platform capable of carrying objects 210. The shopping cart 150 also will have a cart base station 155 which comprises a cart antenna 220, a cart transceiver 225, a cart computer 230 and, in some preferred embodiments, a cart memory 240. One or more computer programs 245 will be executing on the cart computer 230. The cart base station 155 will transmit cart signals 201 to the interior 202 of the cart. The signal 201 strength is such that the field created is strong enough to communicate with any radio frequency (RF) tag 200 attached to an object 210 that is carried by the cart 150. In addition, the cart base station 155 is capable of communicating with a store signal 160 to the store antenna 175. This store signal 160 can be communicated through a first cart antenna 220 or through a separate cart antenna 280. If a second antenna 280 is used, it's likely to be attached to a second cart transceiver 225 for transmission of the store signal 160 at a different frequency than the cart signals 201. If the store signal 160 is transmitted by the first cart antenna 220, the store signal 160 will be at a different frequency and power then the cart signal 201.

The cart computer 230, computer programs 245, and cart memory 240 can be embodied in various preferred ways. In one preferred embodiment, the computer 230 is a logic circuit with the computer program 245 being a logical sequence embodied in the hardware of the logic circuit 230. This logic sequence performs the "Multiple Item Identification Protocol" described below in the FIG. 6 description. The protocol identifies individual tags and enables the computer 230 to access the object description 344, i.e. information provided on the tag memory 340 about the object 210 to which the tag 200 is attached. This information can then be passed to the store computer 170 through the store signals 160. At the store computer 170, the information 344 can be processed. For example, if the object description 344 is the price of the object, the prices of all the objects in the cart can be totalled. This information may or may not be passed back to the cart through the store signal 160 for display to the customer. Alternatively, one or more memory locations 240 can be provided on the base station. If one location is provided, e.g. a memory register 240, the location can be used to add the price of each object to the contents of the register 240 while the tags in the cart are being interrogated. Once all the tags are interrogated, the register 240 will contain the total price of all the objects in the cart. In alternative preferred embodiments, the computer 230 will include a processor with a larger memory 240 and a software program that performs the steps required to interrogate and identify the tags and access the object descriptions 344. In this case, the processing of the object description 344 information does not have to be transmitted 160 to or processed by the store computer 170. (Object descriptions 344 can include a textual description, a product or object code like a UPC code, object price, quantity, quality, etc.)

Figure 3A:
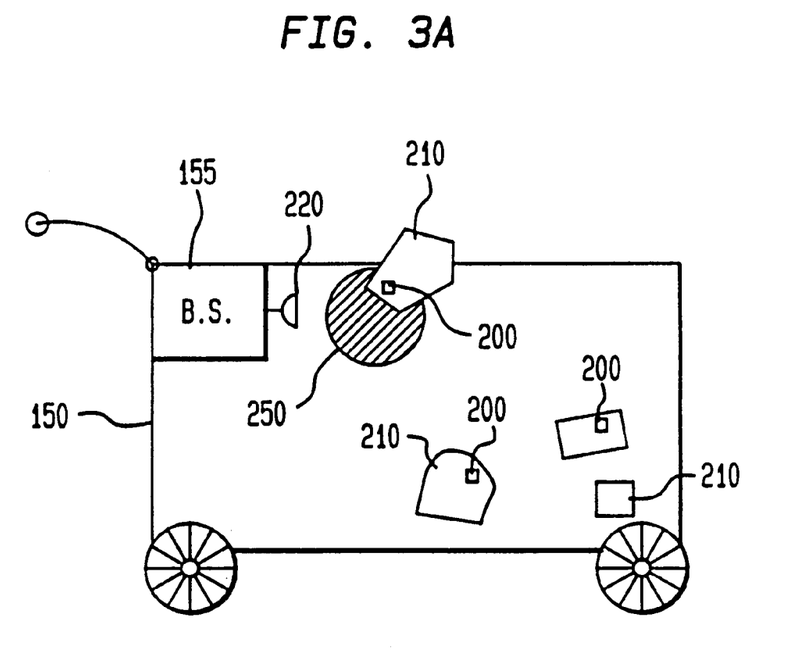
FIGS. 3A and 3B, is a block diagram of the intelligent shopping cart invention (3A) also showing a typical radio frequency tag (3B).

FIG. 3, comprising FIGS. 3A and 3B, shows one preferred alternative embodiment (FIG. 3A) of the cart 150 and the cart base station 155. In this embodiment, the cart radio frequency field 250 is only strong enough to communicate with radio frequency tags 200 on objects 210 being carried by the cart. In this embodiment the cart radio frequency field 250 has a strength that is defined by the physical dimensions of the cart 150, i.e., the RF field 250 does not penetrate the cart walls 411. The cart radio frequency field 250 will not be strong enough to communicate with any radio frequency tag that is attached to an object 210 that is not being carried by the cart 150.

Figure 3B:
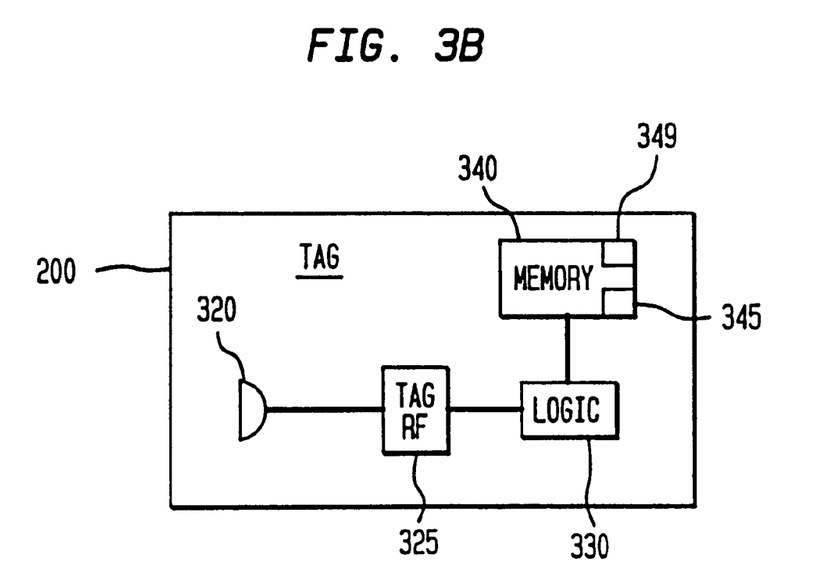

FIG. 3B is a block diagram showing a typical radio frequency tag 200. At least one radio frequency tag will be attached to one object 210 that is placed within the cart. The radio frequency tag 200 will comprise a tag antenna 320, a tag RF section 325, a tag logic 330, and a tag memory 340. In one preferred embodiment, the tag memory 340 will have a memory location 345. This memory location is called the paid memory location 345 and its purpose is to store information that indicates that an object 210 to which the tag 200 is attached is paid for. Tags 200 like this and base stations 155 are well known in the art. For an example of a tag and base station system refer to U.S. Pat. No. 4,075,632 to Baldwin et al. issued on Feb. 21, 1978 which is hereby incorporated by reference in its entirety.

Figure 4:
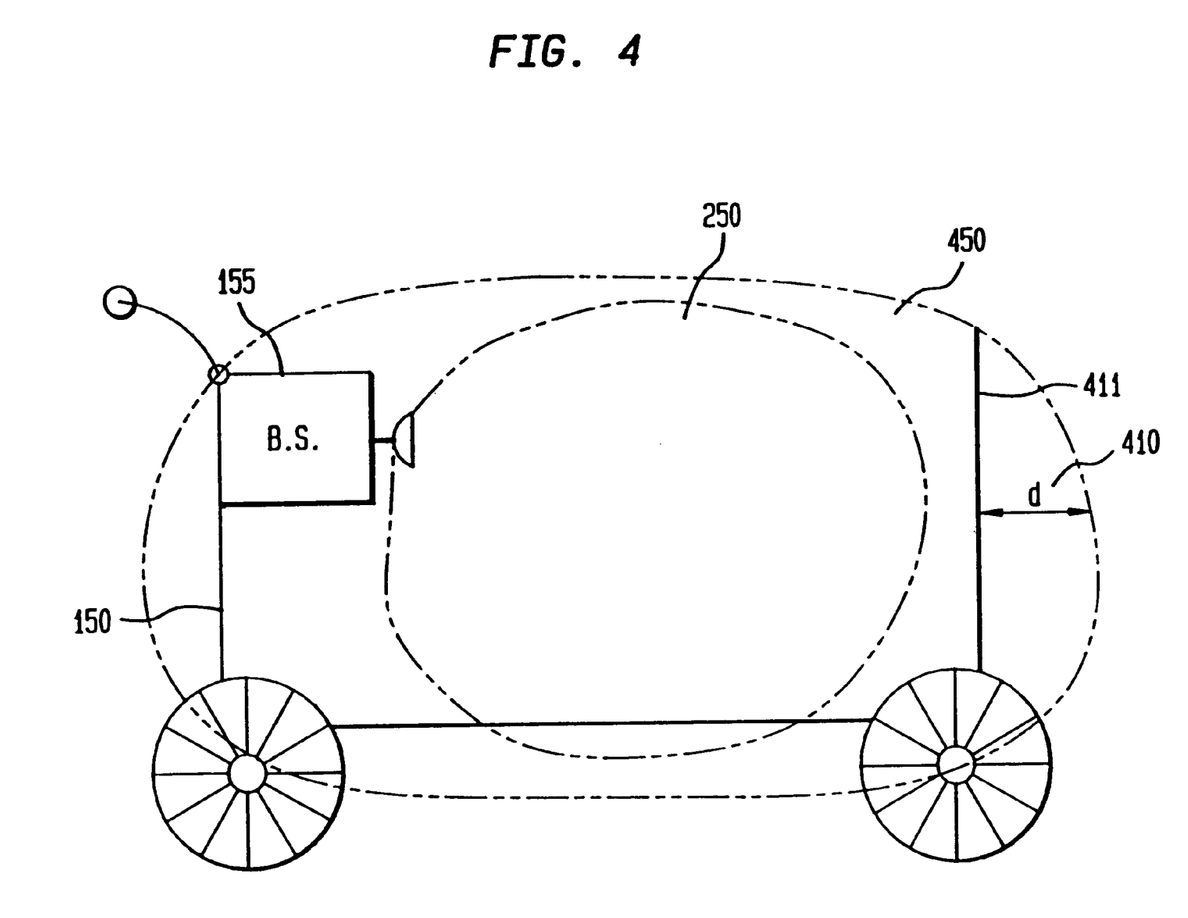
FIG. 4 is a block diagram of the intelligent shopping cart invention showing the cart base station with a radio frequency field within a shopping cart.

FIG. 4 is a block diagram showing an alternative embodiment of the present invention wherein the shopping cart 150 has a base station 155 attached to the back of the cart 150 and communicating a cart signal 201 with a cart radio frequency field 250. As before the base station 150 can communicate with all the radio frequency tags 200 on objects 210 carried by the cart 150. However, in this embodiment, the radio frequency field 250 can extend 450 beyond the confines of the cart by a distance, d 410. This is because the cart antenna 220 and the cart transceiver 225 create a cart signal 201 which is just strong enough to extend beyond the physical limits, e.g. slightly penetrates the walls 411, of the cart 150. In this embodiment the distance. d, is between 2 and 8 inches. However, the extended cart radio frequency field 450 will not extend to a distance where tags 200 attached to objects 210 in other carts 150 can be read. This can be achieved by adjusting the power level of the cart transceiver 225 and appropriate cart antenna 220 design. This adjustment and antenna design are well known. Note that no shielding of the cart is required in this embodiment.

FIG. 5 is a block diagram of two alternative preferred embodiments of the present invention. In these embodiments, the shopping car 150 is enclosed in a radio frequency shield 151. The cart base station 155 is also attached to the bottom of the cart. Within the cart and the shield 151, an antenna is configured to create communication signals 201 that remain within the cart so that tags on objects external to the cart (e.g. on the shelves or in other carts) are not read by the cart base station 155.

In these embodiments, the shield 551 covers the sides of the cart. Alternatively, the shield 551 may also cover the bottom and/or top of the cart 150. A shield 551 with a portion covering the top portion of the cart can have a hinged opening or other opening through which to place objects 210 in the cart. Openings can also be provided in the side of the cart.

The makeup of this shield is determined by the frequency of the signal 201 sent by the base station 155 to the radio frequency tags 200 that are attached to the objects 210 carried by the cart 150. For signals 201 of a very high frequency the radio frequency shield could be a metallic liner, preferably a thin metallic liner or conductive polymer. This could be a metallic covered substrate 551 such as metal on plastics, polyesthers, polymethyl methacrylate (PMMA), polyimides which is attached to the outside or inside periphery of the cart so that the radio frequency field 250 does not extend external to the radio frequency shield 551. Here the thickness of the metal liner is on the order of the skin depth corresponding to the cart signal frequency. The skin depth is a known measure of the attenuation of an electromagnetic signal traveling within a conducting medium and depends on radio frequency and metallic material properties. Alternatively, high permeability metals (NiFe alloys, iron, cobalt, mu metal, and amorphous magnetic materials, e.g, iron/cobalt/silicon alloys) can serve as a shield, especially at frequencies below 1 megahertz. Amorphous magnetic materials are available in sheets.

In an alternative preferred embodiment, the shield 551 could comprise a metallic mesh with mesh spacing that is small compared to the wavelength of the cart signal 201. Typically, the spacing between the metallic elements of the mesh should be less than one quarter wavelength of the cart signal 201. The frame of the cart itself could be made of a metal mesh with the correct spacing.

Shopping carts made of a metal mesh are well known. This invention could easily be applied to such cart by installing an antenna within the cart and choosing a frequency (wavelength) that is large compared to the mesh size of the cart. In one preferred embodiment, the antenna is positioned so that the spacing between the antenna and the metal mesh is an odd multiple of one quarter wavelength from the metal mesh. The spacing between the antenna and the metal mesh can be insured by placing a dielectric around the antenna of an appropriate thickness. Note that by placing a dielectric between the antenna and the metal mesh the spacing can be reduced, i.e. the higher the dielectric constant the smaller the spacing. Using well known methods, one can determine the correct spacing for a given dielectric.

Note that when the cart 150 is covered on its sides (and possibly bottom) with the shield 551, cart signals 201, from a first cart base station 155 and reflected from the object tags 200, are prevented from transmitting laterally (penetrating the cart walls and/or bottom) to other carts (or other areas like shelves 110). In like manner, the signals 201 from other carts are prevented from entering the space within the first cart 150. However, radio frequency signals can still be transmitted through the top of the cart to allow transmission of signals between the cart base station 155 and store antenna 175 mounted above the cart, e.g. in the store ceiling. Alternatively, shielding could be absent from the bottom of the cart 155 so that communication can occur through the cart bottom, e.g., with store antennas below the cart (e.g. in the floor.) In another preferred embodiment, a second antenna 280 can be mounted outside of the shielded volume 152 of the cart 155 in order to communicate 160 with the store antenna 175.

Figure 5A:
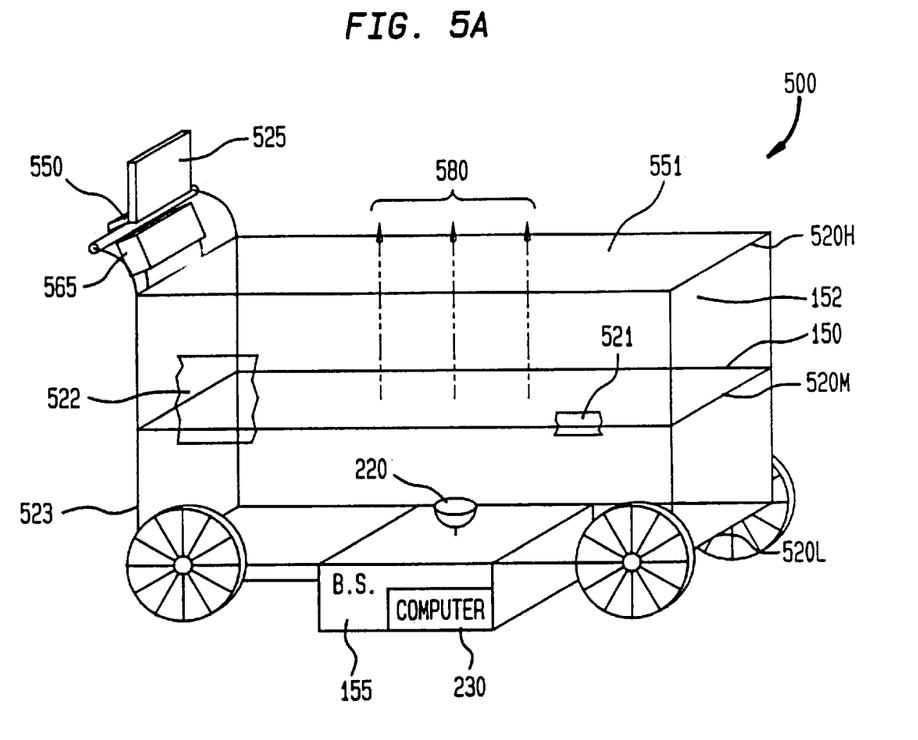
FIGS. 5A and 5B, is a block diagram of the intelligent shopping cart invention showing shielding and two alternative preferred embodiments for placing a radio frequency field of the base station within the shopping cart, i.e., using one or more loop antennas (FIG. 5A) and one or more dipole antennas (FIG. 5B).

FIG. 5A shows one preferred antenna design for the cart 150. The antenna can be designed as a loop located within the cart 150. The loop antenna 520 is oriented so that the axis of the loop 520 propagates an electromagnetic field 530 created mainly in a vertical direction. The antenna can be located at the top 520H, middle 520M, or bottom 520L portions of the cart 150. In one preferred embodiment, the antenna is located in the middle 520M of the cart so that any side lobes of the field 530 are absoirbed by shield 551 which is positioned around the cart external to the antenna 520M. In an alternative preferred embodiment, the antenna 520L is located at the bottom of the cart 150. In this case, the side lobes of the field 530 can be attenuated by the shielding 551 around the sides of the cart 150 and external to the antenna 520L. In addition, shielding of the side lobes of the field 530 is provided by shielding 551 at the bottom of the cart. The antenna 520(H,M, and L) can be protected from physical damage by a durable external coating 521 that could also form a lining 522 of the cart 150. Alternatively, the cart body or part of the cart body 523 can be made of a non metallic material, like plastic, in which the antenna 520 can be molded.

Figure 5B:
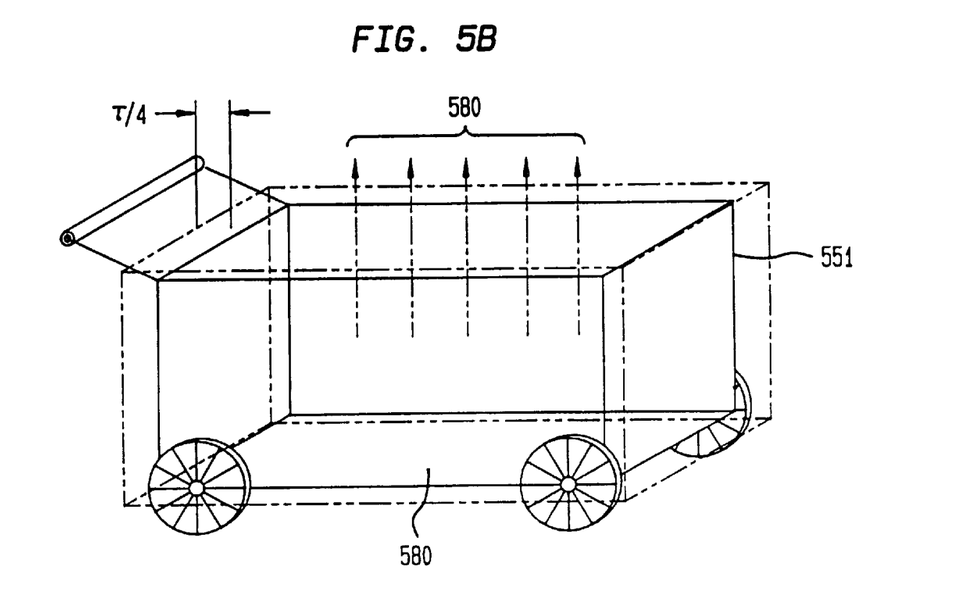

FIG. 5B shows an alternative embodiment. Here one or more dipole antennas 580 are positioned in any direction along the sides and/or bottom of the cart 150. The dipole antennas will be located within the cart so that the metallic shield prevents the signals 201 penetrating through the sides of the cart. Preferably, the dipoles are placed away from the shield 551 a distance of an odd multiple of one quarter wavelength of the frequency of the cart signal 201. This distance will give maximum in phase reflection of the cart signal 201 from the shield 551 to the interior volume of the cart 152.

Given this disclosure, other equivalent antenna designs should become apparent to one of skill in the art. These antenna designs would be made to provide a field of communication that predominantly resides within the hold section 149 of the cart.

FIG. 5 also shows various input and output devices that are attached to the cart 150. These devices could include a keyboard 150 by which the customer can enter data into the cart computer 230. In addition, a cart display 525 could display information to the customer. Other input devices 560 might include a credit card reader to receive payment from the customer and a printer 565 for printing out a bill and/or receipt for the customer's use. Other input devices 560 that accept payment or electronic funds transfer are envisioned. These include devices that accept cash, vouchers (like stamps, coupons, and/or magnetically encoded cards with a cash value), tokens, debit cards, and/or checks. The input device could alternatively cause a bill to be sent (e.g., through a billing program in the store computer 170) to the customer at another time.

Figure 6:
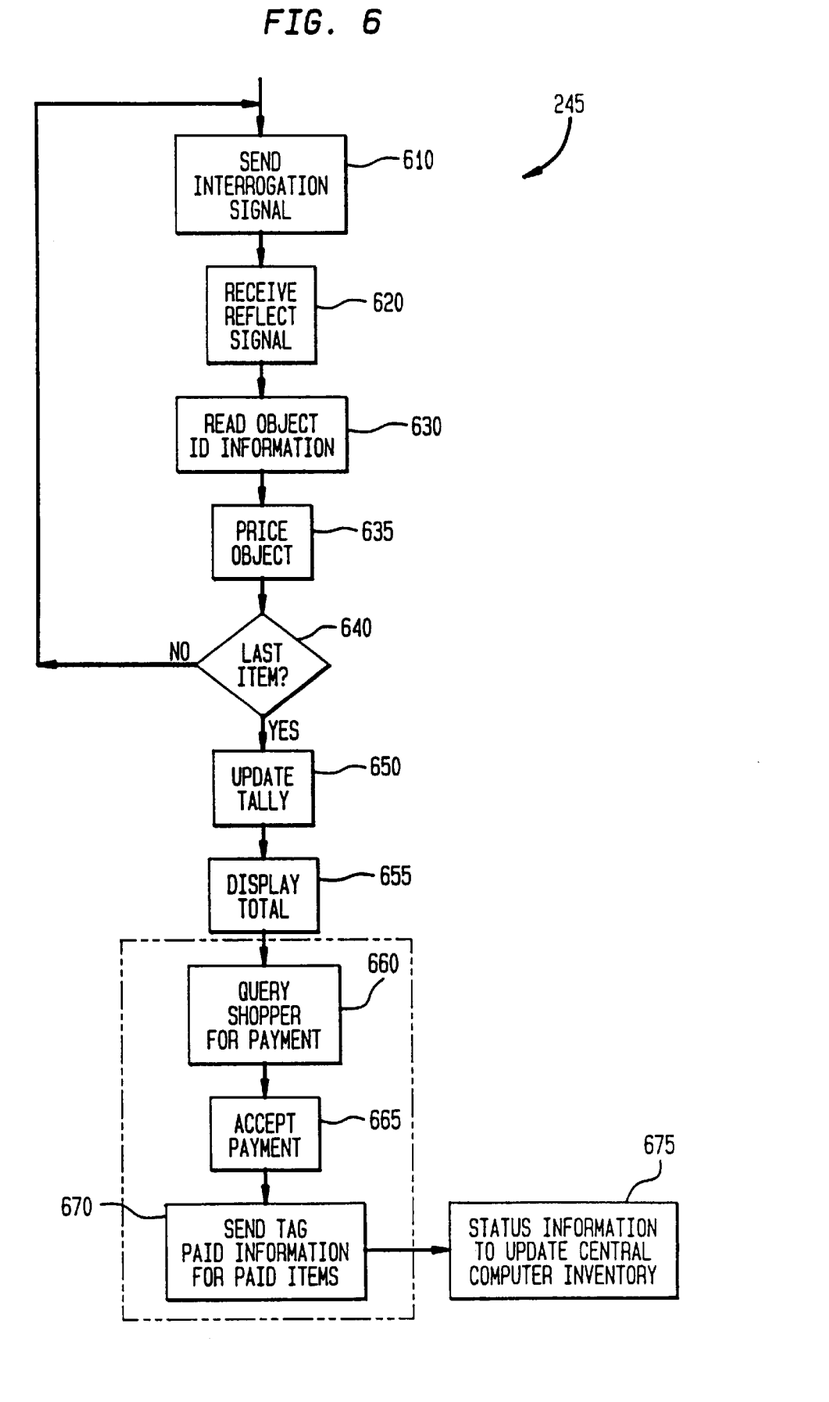
FIG. 6 is a flowchart showing a communication program running in the cart base station.

FIG. 6 is a flowchart showing a preferred tag communication program (or logic) 245 being executed on the cart computer. The program 245 starts by directing the cart transceiver 225 to send an interrogation signal 201 to communicate with the tags in the cart. The interrogation signal will be received by the tag antenna 320 and through the tag radio frequency section 325 could typically power the tag logic 330 and memory 340. The memory section 340 will pass information, e.g., object description 344, onto the received signal through the tag logic section 330 by modulating the received signal 201. The communication will be completed in step 620 when the tag reflects the received signal back as a cart signal 201 to the cart antenna 220. In step 630 the base station will read and identify every radio frequency tag that is attached to an object 210 being carried by the cart 150. The step 630 can be performed by any known process for reading multiple radio frequency tags in a radio frequency field. In one preferred embodiment, this method is detailed in U.S. patent application Ser. No. 08/304,340 filed on Sep. 12, 1994 by S. S. Chan et al. and entitled "Multiple Item Radio Frequency Tag Identification Protocol". This application is herein incorporated by reference in its entirety. This invention discloses a method for identifying each of many tags in the radio frequency field by identifying one tag at a time in the radio frequency field 250. In step 630, information, i.e., object description 344, from each of the identified tags, encoded on the cart signal 201 by each respective tag 200, can also be extracted using the Chan method.

This object description 344 can include the price of the object 210 to which the tag 200 is attached. In step 635, the price recorded in a memory location on the each of the tags is determined in addition to an identification of the item/object to which the identified tag is attached.

The process is repeated 640 for all objects in the cart. In step 640 the program determines whether or not the last item/object in the cart has been communicated with. If there are further items/objects in the cart that have not been communicated with, the program/process 245 returns back to step 610 to send a next interrogation signal 201 to the cart.

In one preferred embodiment, the entire program/method 245, starting with step 610, runs periodically. This means that all the selected objects in the cart are re-polled periodically. The period is preferably between 1 second and 5 minutes, more preferably between 2 to 5 repetitions per minute. Other cycle times are possible. The program/method 245 can also be repeated at a customer request, e.g. by pressing button total 770. (See FIG. 7.)

In step 650, the information that identifies the object to which the identified tag is attached and the associated price of the object is stored in a data structure in cart memory. (See FIG. 10 for a description of this data structure 1000.)

Figure 10:
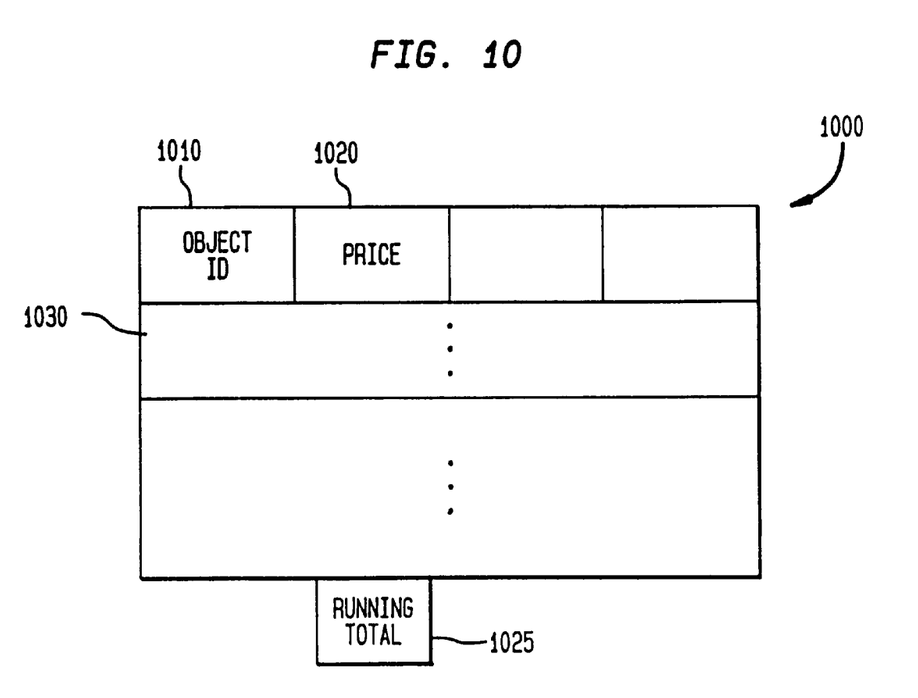
FIG. 10 is a block diagram of a typical data structure stored in a cart memory.

In one preferred embodiment, the entire data structure (tally) 1000 is completely replaced for each repetition of the method 245, i.e., each complete polling of the objects in the cart. This is done to maintain an updated tally of objects/items in the cart. By doing this, objects/items that are removed from the cart will not be present in the most current tally (data structure 1000).

In an alternative embodiment, a different step 650 can be performed. In this embodiment, objects identified in a later repetition are compared to objects identified in a next earlier repetition. Objects identified in the later repetition that are not in the earlier repetition are added to the data structure (tally) 1000. Objects not identified in the later repetition that are in the earlier repetition are removed from the data structure (tally) 1000.

The program 245 can continue to optionally display the total cost of all the objects/items in the cart in step 655. This display can be presented to the customer 151 on the cart display 525 automatically or upon customer request.

In one preferred embodiment, after the display of the total is presented to the customer, the customer can be queried whether or not it is time to pay for the objects/items carried in the cart. This can be done by sending a message to the customer 151 on the cart display 525 in step 660. At this point, the program 245 can continue to query the input device 560 to see if the customer has paid for the items carried in the cart with a credit card or other bill paying device. If so, the program accepts the payment from the customer by debiting the customer account in step 665.

At this point the program 245 would continue in step 670 to send another signal to each of the tags 200 attached to each of the objects/items 210 carried by the cart, i.e. those currently stored as entries in data structure 1000. This cart signal 201 would write paid information to the paid memory location 345 of each tag. At this point, the data structure 1000 (tally) would also be cleared (i.e., all objects listed in the data structure would be erased.)

In an alternative embodiment, the customer would pay for the selected objects/items 210 by cash. In this case, a remote transmitter could write paid information to the paid memory location 345 of each tag and clear the data structure (tally) 1000. This transmitter can be operated by a store clerk.

In alternative preferred embodiments step 675 is performed to send status information from the cart base station 155 through either cart antenna 220 or 280 back to the store antenna 175 through a store signal 160. This store signal 160 would carry the status information to update the memory 172 of the store computer 170. For example, store information 173 about store inventory could be updated by deleting the items paid for in steps 665.

Figure 7:
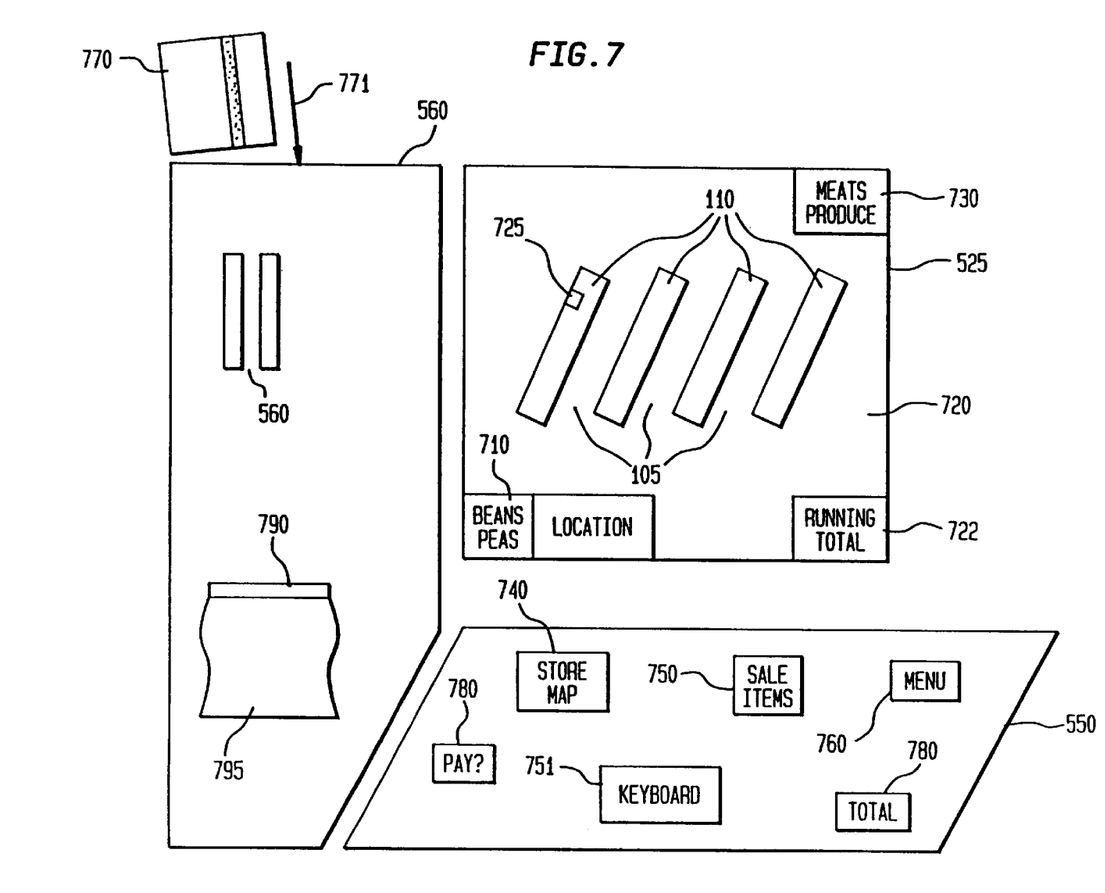
FIG. 7 is a block diagram showing a display and other input and output devices connected to the cart computer.

FIG. 7 is a block diagram showing various types of input and output devices that can be attached to the cart computer 155. These devices include a graphical display 525, a keyboard and/or button input device 550, a printer 790 and a payment device 560.

The payment device 560 could be a standard credit card reader which can debit a credit card 770 account by swiping the credit card 771 through the credit card reader 560. In one embodiment, this transaction could be handled by sending store signals 160 between the cart base station 155 and store computer 170. For example, modems within the store computer 170 could access the customer 151 credit information before the store computer would enable the cart base station 155 to write the "paid information" in step 670. A message would be sent on the display 525 informing the customer of the shortage of funds.

The printer 790 can be any known printer capable of printing a receipt 795 and/or bill 795 for the customer. The graphical display 525 can also be any known graphical display.

Different types of information can be displayed to the customer using this display. For example, a menu 730 can be presented to the customer that would include a listing of the major departments or the major items for sale in the store. In addition, a map 720 of the store can be presented to the customer. The map would have indications of the various storage areas 110 and the aisle 105 and show the customer locations on the storage areas 110 where specific objects are for sale. For example, in a retail store particular items of merchandise that might be on-sale would be displayed at their location 725 on the store map 720 in a particular color. The running total of the items selected by the customer that are carried by the cart can also be displayed on the graphical display 525 in a running total area 722. In another location of the display 710, various items that are on-sale or of special interest to the customer can be displayed.

The button input device 550 can have various input selections for the customer. These might include a keyboard that the customer 115 can use to query the store map 720 for specific items of interest, a button 740 that displays the store map, a button 750 displays sale items in a location on the display like location 720 and a menu button 760 which causes the menu 730 to display on the graphical display 525. In addition, a button 780 can be provided on the input device 550 that indicates that the customer is ready to pay. When this button is pushed, program 245 can be run to update the data structure 1000 and the credit card reader 560 can be enabled.

Figure 8:
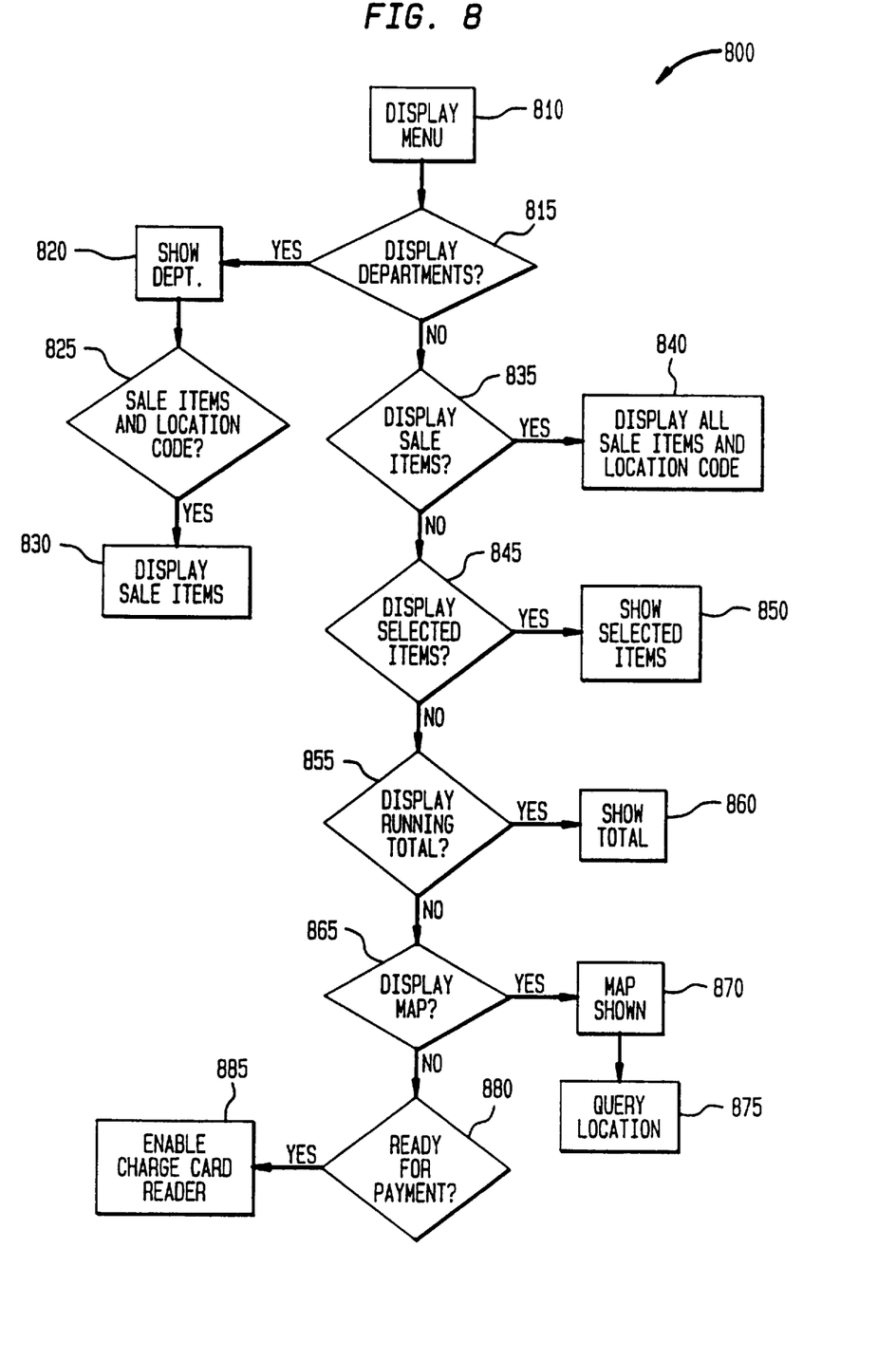
FIG. 8 is a flowchart showing a display and payment program running on the cart computer.

FIG. 8 is a flowchart showing one preferred embodiment of a display and payment program 800 running on the cart computer 230 that controls the display 525 and the other input and output devices attached to the cart. The program 800 begins by displaying the menu in step 810. This is the menu that is displayed in a display 525 location 730. In step 815, the display 525 asks the customer 151 whether or not to display the departments of the store. If the customer responds affirmatively by either pressing a button, the keyboard 550, or a soft key on the display 520, the departments of the store are shown on the display in step 820. The departments can be listed as text or shown as the store map 720. Further, the sale items in those departments 825 and their location can be shown on the display in step 825. If the customer elects not to show the departments, the customer can be queried in step 835 as to whether the sale items in the store should be displayed. If the customer wishes to see the sale items, they are displayed in step 840 along with their location codes. A listing of the sale items can be shown in a text location 710 on the display 520 or could also be displayed on the store map 720. If the customer elects not to see the sale items, the customer would be queried to see if there are any selected items that would interest the customer in step 845. The customer might input the selected items through the keyboard 751. These selected items then would be displayed either as text in the location area 710 or on the map of the store 720. The customer is then queried in step 855 whether or not a display of the running total of the items in the cart are of interest. If the customer wishes to see a running total, he could indicate this by pressing a soft button on the display 525 or pressing one of the buttons, e.g., 770, on the input device 550. If the customer elects to see the running total, the running total is shown on the display 722 in step 860. The customer can also be asked in step 865 whether or not a map of the store should be displayed. If the customer elects the map, the map will be shown in step 870 on location 720 of the display 525. The customer can also query the display 525 about the location of an object 210 from the map in step 875. This query is inputted through the display by a touch screen mechanism. In step 880, the customer could be queried to determine if the customer is ready for payment. If the customer indicates in the affirmative, the charge card reader, or other payment device, can be enabled in step 885. Once the customer pays for the object, e.g., by swiping the credit card 711 in the reader 560, the cart base station sends a signal to all the tags within the cart to write paid information on the paid memory location 345.

In alternative embodiments, the display would not query the customer 151 but only respond to customer requests inputted through the button input device 550 or display screen 525.

Figure 9:
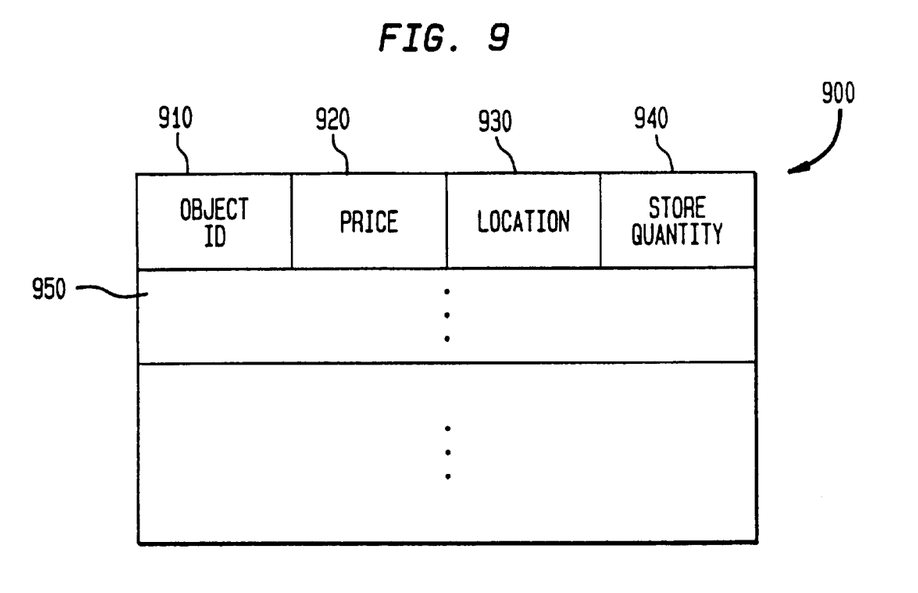
FIG. 9 is a block diagram of a typical data structure in a store computer memory.

FIG. 9 is a block diagram of one preferred data structure stored in the store computer 170. The data structure has store information 173 that includes an object identification block 910, an object price block 920, an object location 930 and the quantity of the object stored in inventory in the store, block 940. Each object sold in the store could have an entry 950 in this data structure 900.

FIG. 10 is a block diagram of one preferred data structure 1000 stored in cart memory. This data structure 1000 stores entries of objects that are carried by the cart. Each item carried by the cart would have one entry 1030 in the data structure 1000. The data structure would include information about object identification, block 1010, and object price, block 1020, for each entry 1030 in the data structure 1000. The data structure 1000 would also have a location 1025 that would contain the total price for all the objects carried in the cart.

Figure 11:
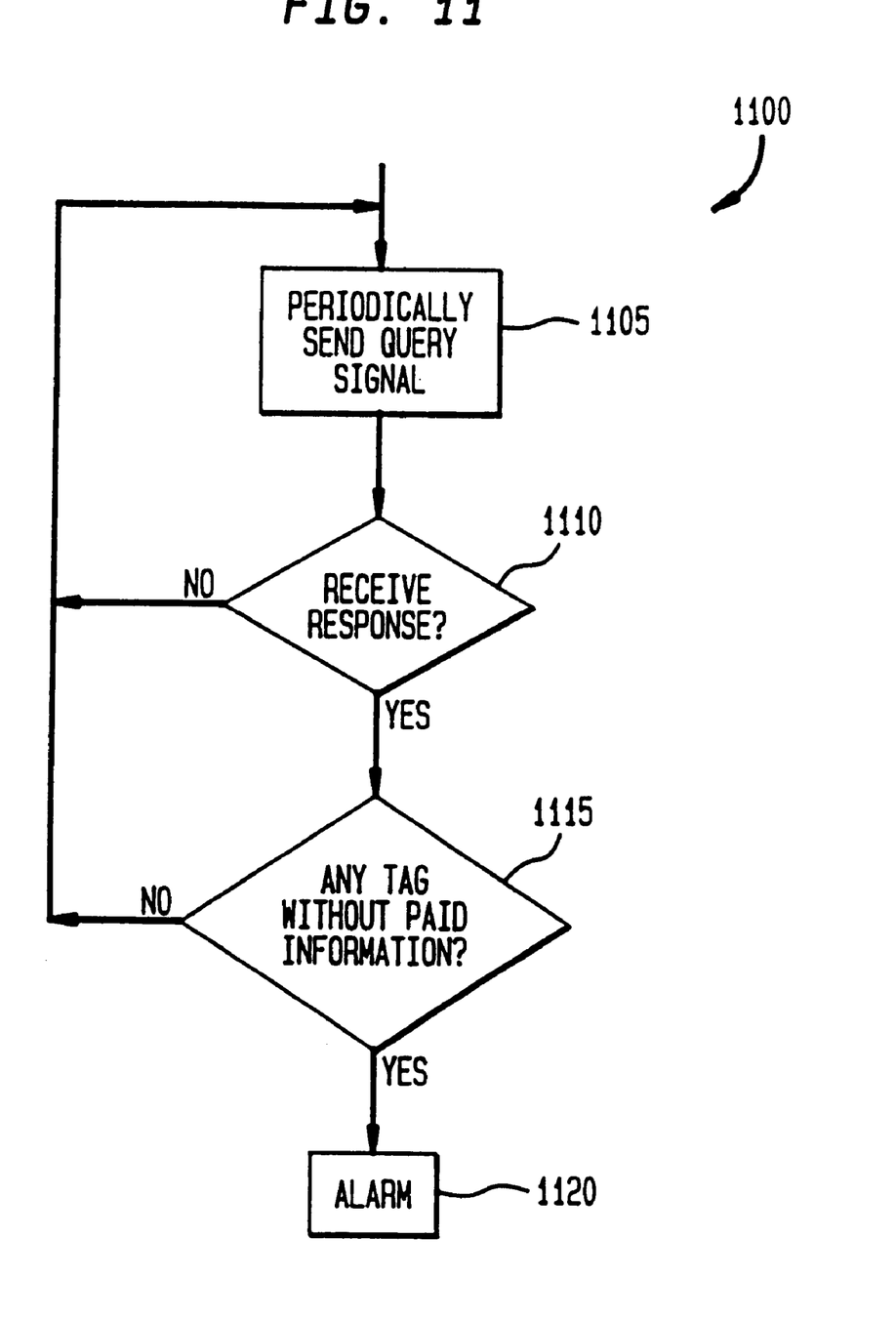
FIG. 11 is a flowchart of a security program running in a security base station.

FIG. 11 is a flowchart of one preferred security program 1100 that would run on the security base station 180. The program would periodically send query signals in step 1105. The purpose of the query signals would be to determine whether there are any tags attached to objects that are passing in the radio frequency field of the security signal 184 in FIG. 1. If an object is within the radio frequency field of the security signal 184, the tag will respond in step 1110. If there is no response, this means that there are no radio frequency tags in the RF field of the security signal 184 and the process will be repeated at some time period in step 1105. However, if there are one or more tags 200 within the security field, the tag 200 will respond.

In its response, the tag 200 will indicate whether or not there is information in the paid memory location 345 of the responding tag 200. Information in this memory location 345 can simply be a set bit indicating that the item to which the radio frequency tag is attached has been paid for. This information was programmed into the paid memory location 345 by the cart base station after the items in the cart were paid for. In alternative embodiments additional information can be stored in this field.

In step 1115, if there are no tags that have a null in the paid memory location 345, the program returns to the beginning and starts sending periodic query signals in step 1105. However, if one or more of the tags within the radio frequency field of the security signal 184 indicate that they have not been paid for, i.e., have a null in the paid memory field 345, an alarm is activated in step 1120.

Base stations 155 can be powered by battery. These batteries can be charged by known methods, i.e., a battery charging station. This is an area where some or all of the carts can be placed when not in use and/or at the end of the shopping day. These areas can also have facilities to reprogram the base station 155 by changing the base station memory 240 if necessary. For example, sale items and prices can be changed in the memory 240. These changes can also be done by a radio communication through the base station antenna (220, 280). This communication can be achieved by way of a signal sent through the store antenna 175. Alternatively, a hand held or locally placed transmitter can be used to communicate with the cart base stations 155 while the carts are located at the charging station.

Given this disclosure it will become apparent to one skilled in the art that alternative equivalent embodiments are possible. These equivalent embodiments are also within the contemplation of the inventors.

We claim:

1. A container for transporting at least one of a plurality of objects, each of said objects including at least one of a plurality of distinctive radio frequency tags, each radio frequency tag of said radio frequency tags having description information of a corresponding one of said objects, said container comprising:

a transceiver;

an antenna, operatively connected to said transceiver, for creating a radio frequency field within the container;

a computer, operatively connected to said transceiver, for causing the transceiver to periodically interrogate all of said radio frequency tags within the radio frequency field for accessing said description information from said radio frequency tags; and a memory, operatively connected to said computer, for storing accumulated information based on said description information.

2. A container, as in claim 1, wherein the description information includes a unit price of each of said objects in the container and the accumulated information includes a total price of the objects in the container.

3. A container, as in claim 2, wherein said memory is for storing said unit price and said total price.

4. A container, as in claim 3, wherein the memory is positioned remotely from the container and communicates with said computer via said transceiver to obtain the description information.

5. A container, as in claim 3, wherein the memory is located on the container.

6. A container, as in claim 2, wherein the computer interrogates all of the objects in the container at regular periodic intervals.

7. The container as in claim 6, wherein said intervals have a length in the range of 1 second to 5 minutes.

8. The container as in claim 6, wherein said intervals have a length in the range of 12 seconds to 30 seconds.

9. A container, as in claim 1, further comprising an input device attached to the container for receiving payment.

10. A container, as in claim 9, wherein the input device accepts the payment from at least one of cash, a check, a voucher, tokens, a credit card, and a debit card.

11. The container as in claim 9, wherein at least one of said radio frequency tags includes a security device and after said input device receives said payment, said security device is altered to indicate said payment has been received.

12. A container, as in claim 1, wherein the description information includes at least one of a uniform pricing code ("UPC"), a text description, and a product code.

13. A container, as in claim 1, further comprising a radio frequency shield for preventing the radio frequency field from extending beyond the container.

14. The container as in claim 1, wherein said radio frequency field has a size approximately equal to that of said container.

15. The container as in claim 1, wherein said computer interrogates said objects periodically and when directed to by an external source.

16. A container for transporting at least one of a plurality of objects, each of said objects including at least one of a plurality of distinctive radio frequency tags, each radio frequency tag of said radio frequency tags having description information of a corresponding one of said objects, said container comprising:
   an object storage portion having sides;
   a base station, operatively connected to said object storage portion and having a transceiver, at least one antenna operatively connected to said transceiver, a computer, operatively connected to said transceiver, having a memory, said computer controlling said transceiver to create a radio frequency field within the object storage portion;
   a shield, connected to said sides, for preventing said radio frequency field from penetrating said sides of the container;
   a computer, connected to said computer and being controlled by the computer for causing the transceiver to periodically interrogate all of said radio frequency tags within the radio frequency field; and
   a data structure in the container memory, said data structure having entries, said data structure being periodically updated by the computer to include an entry of said entries for each object of said objects in the object storage portion.

17. A container, as in claim 16, wherein the antenna comprises at least one loop antenna.

18. A container, as in claim 17, wherein the loop antenna is attached to the sides of the container.

19. A container, as in claim 18, wherein one of the sides comprises bottom of the container.

20. A container, as in claim 17, wherein the loop antenna is oriented so that the radio frequency field is oriented vertically within the object storage portion.

21. A container, as in claim 16, wherein the antenna comprises one more dipole antennas.

22. A container, as in claim 21, wherein said at least one dipole antenna are attached to a side of said sides.

23. The container as in claim 16, wherein said shield comprises a metal mesh.

24. The container as in claim 23, wherein said radio frequency field has a wavelength and said metal mesh has a mesh spacing of less than one quarter of said wavelength.

25. A system in a store for selling objects, comprising:
   a store computer with a store memory having a store inventory of said objects;
   at least one container for transporting at least one of said objects, each of said objects including at least one of a plurality of distinctive radio frequency tags, each radio frequency tag of said radio frequency tags having description information of a corresponding one of said objects, said at least one container further comprising:
      a container base station having a container transceiver operatively connected to said container base station, a container antenna operatively connected to said container transceiver, and a container computer, operatively connected to said container transceiver, having a container memory, said container computer controlling said container transceiver and said container antenna to create a radio frequency field within the container;
      a computer, operatively connected to said container computer, said computer being controlled by the container computer to cause said container transceiver to periodically interrogate all of said radio frequency tags within the radio frequency field; and
      a data structure in the container memory having entries, said data structure being periodically updated by the computer to include an entry of said entries for each object of said objects in the container;
   a store transceiver, operatively connected to said store computer, for communicating with the container base station;
   at least one store antenna, operatively connected to said store transceiver, said store antenna receiving radio frequency status information signals from said container base station through the container antenna, the store transceiver being linked to the store computer such that the status information signals sent by the container base station update the store inventory in the store memory.

26. A system in a store for selling objects, comprising:
   a store computer with a store memory having store information about the objects;
   at least one container for transporting at least one of said objects, each of said objects including at least one of a plurality of distinctive radio frequency tags, each radio frequency tag of said radio frequency tags having description information of a corresponding one of said objects, said container further comprising:
      a container base station having a container transceiver operatively connected to said container base station a container antenna operatively connected to said container transceiver, and a container computer, operatively connected to said container transceiver, having a container memory, said container computer controlling said container transceiver and said container antenna to create a radio frequency field within the container;
      a computer, operatively connected to said container computer, said computer being controlled by the container computer to cause said container transceiver to periodically interrogate all of said radio frequency tags within the radio frequency field; and
      a memory, operatively connected to said computer, for storing accumulated information based on said description information
   a store transceiver, operatively connected to said store computer, for communicating with the container base station at least one store antenna, operatively connected to said store transceiver, said store antenna sending radio frequency store information signals to said container base station.

27. A system in a store for selling objects, comprising:
a store computer with a store memory having store information about the objects;
at least one container for transporting at least one of said objects, each of said objects including at least one of a plurality of distinctive radio frequency tags, each radio frequency tag of said radio frequency tags having description information of a corresponding one of said objects, said containers further comprising:
   a container base station having a container transceiver operatively connected to said container base station, a container antenna operatively connected to said container transceiver, and a container computer, operatively connected to said container transceiver, having a container memory, said container computer controlling said container transceiver and said container antenna to create a radio frequency field within the container;
   a computer, operatively connected to said container computer, said computer being controlled by the container computer to cause said container transceiver to periodically interrogate all of said radio frequency tags within the radio frequency field; and
   a data structure in the container memory having entries, said data structure being periodically updated by the computer to include an entry of said entries for each object of said objects in the container; and
a store transceiver, operatively connected to said store computer, for communicating with the container base station
at least one store antenna, operatively connected to said store transceiver, said store antenna sending radio frequency store information signals to said container base station.

28. A system, as in claim 27, wherein the store information signals include store information and said container further comprises a container display for displaying said store information.

29. A system, as in claim 28, wherein the store information includes an identification of said objects that have a reduced price.

30. A system, as in claim 28, wherein the store information includes location information of at least one of said objects in the store.

31. The system as in claim 27, further comprising sensors positioned within said store for communicating with said radio frequency tags and preventing unpaid objects of said objects from being removed from the store.

32. A container for transporting at least one of a plurality of objects, each of said objects including at least one of a plurality of distinctive radio frequency identification means, each radio frequency identification means having description information of a corresponding one of said objects, said container comprising:
   means for receiving and transmitting radio frequency signals;
   means, connected to said receiving means, for creating a radio frequency field within the container;
   means, connected to said receiving means, for periodically interrogating all of said radio frequency identification means within the radio frequency field and accessing said description information from said radio frequency identification means; and
   means, connected to said interrogating means, for storing accumulated information based on said description information.

33. A method for determining descriptive information about objects in a container each of said objects including at least one of a plurality of distinctive radio frequency tags, each radio frequency tag of said radio frequency tags having said description information of a corresponding one of said objects, said method comprising steps of:
   creating a radio frequency field within the container;
   periodically sending an interrogation signal through said radio frequency field within the container;
   receiving said description information from all of said radio frequency tags within the radio frequency field; and
   storing said description information obtained in said receiving step.

* * * * *